2,782,251
CABLES FOR HIGH FREQUENCY USE

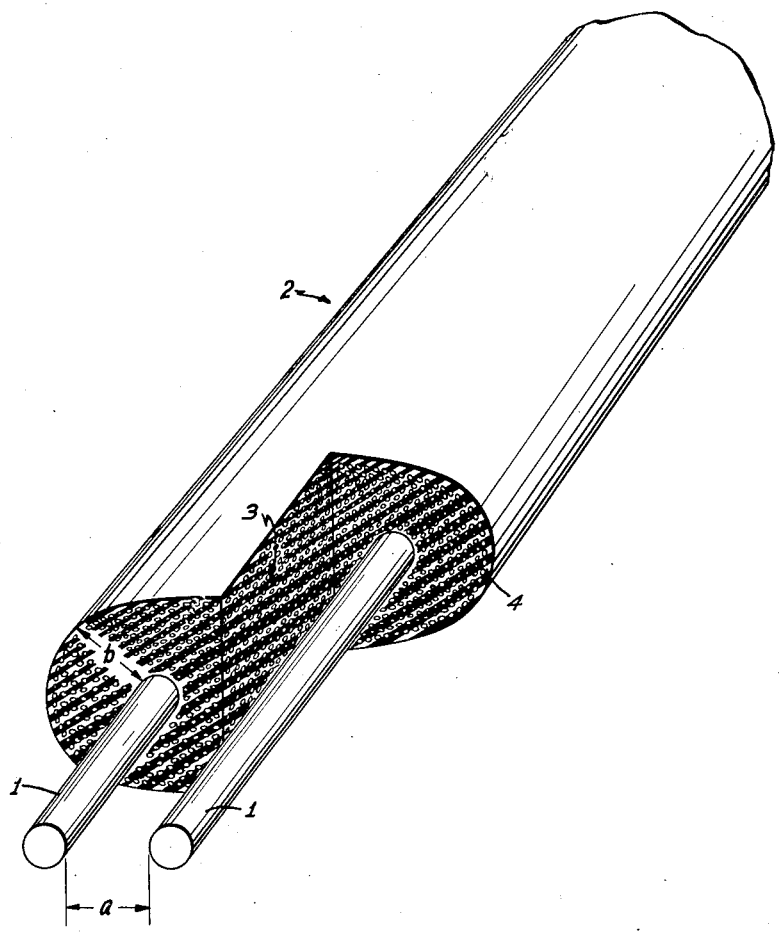

Lawrence C. Ebel, Dobbs Ferry, and Ralph G. D'Ascoli, Yonkers, N. Y., assignors, by mesne assignments, to Belden Manufacturing Company, Chicago, Ill., a corporation of Illinois Application November 29, 1952, Serial No. 323,251

3 Claims. (Cl. 174—113)

This invention relates to cables for conducting high frequency electric energy, especially in the very high and ultra high frequency ranges extending from 30 to 3000 megacycles. The invention is particularly directed to the provision of a cable for such use out-of-doors where it is exposed to all the vagaries of the weather and where its outer surface can be expected to acquire more or less conductive coatings or deposits of moisture, salt spray, etc.

The new cable comprises at least one metallic conductor embedded directly in and supported throughout the length of the cable by a flexible monolithic body of polyethylene insulation. Such insulation, in accordance with the invention, is of cellular structure throughout its mass, the individual cells being substantially all separated from each other by impervious walls of polyethylene. At the outer surface of the insulation, however, is a smooth substantially non-porous skin of polyethylene which is integral with the underlying cellular mass.

In consequence of its cellular structure, the insulation of the new cable comprises a large proportion by volume of gas-filled spaces, sufficient so that the bulk density of the insulation is at least 40% less than that of solid polyethylene. As a result, its high frequency dielectric properties are very much superior to those of the best grade of solid polyethylene. The surface skin of non-porous polyethylene insures against penetration of moisture either in the solid or vapor state into the body of the insulation, and even if there be local cracks or perforations extending through such skin, the cellular character of the underlying mass of insulation is nonetheless still impenetrable by moisture. Accordingly, the excellent high frequency properties of the new cable are preserved even in damp or wet locations.

For much high frequency use, as for V. H. F. or U. H. F. television lead-in service, the new cable comprises a pair of metallic conductors embedded and supported side by side in spaced relation within the cellular mass of polyethylene insulation. A feature of such cables in accordance with the invention is that the cross-sectional dimensions of the insulation are such that the minimum distance radially outwardly from either conductor to the outer surface of the insulation is at least about equal to the spacing between conductors. Thereby the capacitive coupling of either conductor to ground when the outer surface skin of the cable is wet and grounded is at least about as small as the capacitive coupling between conductors.

An advantageous embodiment of a cable according to the invention is shown in the single figure of the accompanying drawing. Such cable comprises two metallic conductors 1 of copper or other suitable metal, arranged in spaced parallel relation and embedded in a monolithic mass of polyethylene insulation 2. The insulation 2 extends throughout the entire length of the cable and serves to maintain the conductors 1 in properly spaced relation.

The insulation 2 is, in accordance with the invention, of the cellular structure indicated at 3 throughout its entire mass, except for the provision of a smooth substantially nonporous surface skin 4 of polyethylene. It is important that the mass of insulation 2 be of cellular as distinguished from spongy structure. The cellular structure 3 is such that the individual cells are substantially all separated from one another by impervious walls of polyethylene. A spongy structure, on the other hand, is one in which the pores are in more or less free communication with one another. The cellular structure employed in accordance with the invention is incapable of absorbing moisture unless it is severely damaged; whereas a spongy structure (which in accordance with the invention must be avoided) absorbs moisture freely. We have found that the cellular polyethylene insulation as above described suffers little impairment of its excellent high-frequency dielectric properties when exposed to moisture. A similar-appearing polyethylene of spongy structure, which may have excellent dielectric properties when dry, is on the other hand completely unsatisfactory for high frequency insulation uses in moist atmospheres.

The aggregate volume of the cells of the insulation mass 2 should be sufficient to reduce the bulk density of the insulation to a value at least 40% less than that of solid polyethylene in order to obtain a substantial improvement in its high frequency dielectric properties. In some instances, cables having a somewhat lesser reduction in bulk density of the insulation may be used with advantage; and, of course, a much higher reduction in bulk density is desirable, up to the limit of a bulk density of about 75% less than that of solid polyethylene. This minimum bulk density value is set primarily by mechanical considerations; at lower bulk densities the cellular polyethylene becomes mechanically so weak that it does not provide effective support for the conductors when the cable is roughly handled.

In order to minimize the amount of moisture or other foreign deposit that can accumulate on the surface of the cable when used out-of-doors, the thin skin layer 4 is provided. By the provision of this skin, the exposed surface area of the body of insulation is kept at a minimum, and it is kept substantially free of pores which might serve to accumulate objectionably heavy deposits of foreign matter which could impair the electrical properties of the cable. The skin 4, of course, serves to exclude moisture from the underlying cellular body of the insulation; but even if the skin is punctured at any point, the cellular nature of the underlying structure suffices to prevent penetration of moisture therethrough.

In the case of two-conductor cables of the character shown in the drawing, in which the two conductors are arranged parallel to each other and are separated by a distance $a$, it is advantageous to proportion the cross-sectional dimension of the insulation 2 so that the minimum radial distance $b$ from either conductor to the surface of the insulation is substantially equal to the distance $a$. Thereby, when the cable is used out doors and its surface acquires a grounded conductive deposit of moisture or other foreign substance, the capacitive coupling of each conductor to ground is kept substantially as small as the capacitive coupling between conductors, and undesirable attenuation of high frequency signals carried by the cable is avoided.

An advantageous feature of the new cable is that the conductor 1 can be bared for the purpose of making connections simply by cutting away the insulation 2, without taking any special precautions to prevent the entrance of moisture through the cut end into the interior of the insulation. The cellular structure of the insulation suffices to insure that moisture will not penetrate through an exposed end of the insulation any more than it will penetrate through the skin 4 itself.

We claim:

1. An electrical cable particularly adapted for the transmission of high frequency electrical energy, comprising a pair of spaced conductor wires, a continuous core of multi-cellular, low density insulating material separating said conductor wires, and a sheath of high density insulating material impervious to fluid and compatible with the material forming said core surrounding said electrical conductor wires and core, the core having a dielectric constant less than that of the sheath, at least a substantial proportion of the individual cells in said core being sealed from each other and said core being bonded directly to said sheath to prevent the longitudinal flow of gas or vapor through the interior of said sheath.

2. An electrical cable particularly adapted for the transmission of high frequency electrical energy comprising a pair of spaced conductor wires, a continuous core of multi-cellular, low density insulating material separating said conductor wires, and a sheath of high density insulating material impervious to fluid and compatible with the material forming said core surrounding said electrical conductor wires and core, the core having a dielectric constant less than that of the sheath, at least a substantial proportion of the individual cells in said core being sealed from each other and said core being bonded directly to said sheath to prevent the longitudinal flow of gas or vapor through the interior of said sheath, and the insulation surrounding said conductor wires extending for a distance such that the minimum distance radially outwardly from either conductor to the outer surface of the cable is at least equal to the spacing between said conductors, whereby the capacitive coupling of either conductor to ground when the outer surface of the cable is wet and grounded is at least about as small as the capacitive coupling between the conductors.

3. An electrical cable particularly adapted for the transmission of high frequency electrical energy, comprising a pair of parallel spaced conductor wires, said conductor wires being embedded and held in said parallel spaced relation throughout the length of the cable by a continuous core of multi-cellular polyethylene insulating material, and a sheath of solid polyethylene insulating material impervious to fluid surrounding said conductor wires and core, said multi-cellular polyethylene insulating material having a bulk density at least 40% less than that of said solid polyethylene insulating material, at least a substantial proportion of the individual cells in said core being sealed from each other and said core being bonded directly to said sheath to prevent the longitudinal flow of gas or vapor through the interior of said sheath, and the insulation about said conductor wires extending for a distance such that the minimum distance radially outwardly from either conductor to the outer surface of the cable is at least equal to the spacing between said conductors, whereby the capacitive coupling of either conductor to ground when the outer surface of the cable is wet and grounded is at least about as small as the capacitive coupling between the conductors.

References Cited in the file of this patent

UNITED STATES PATENTS

| | | |
|---|---|---|
| 1,659,371 | Merrill | Feb. 14, 1928 |
| 1,982,288 | Evans | Nov. 27, 1934 |
| 2,422,727 | Gooding | June 24, 1947 |
| 2,466,271 | Pfleumer | Apr. 5, 1949 |
| 2,480,170 | Weston | Aug. 30, 1949 |
| 2,518,454 | Elliott | Aug. 15, 1950 |
| 2,532,243 | Ott | Nov. 28, 1950 |

FOREIGN PATENTS

| | | |
|---|---|---|
| 400,781 | Great Britain | Nov. 2, 1933 |
| 582,270 | Great Britain | Nov. 11, 1946 |